(12) United States Patent
Roxbury et al.

(10) Patent No.: US 12,446,804 B2
(45) Date of Patent: Oct. 21, 2025

(54) WEARABLE OPTICAL MICROFIBROUS MATERIAL WITH ENCAPSULATED NANOSENSORS FOR WIRELESS MONITORING OF CHEMICAL ANALYTES

(71) Applicant: University of Rhode Island Board of Trustees, Kingston, RI (US)

(72) Inventors: Daniel Roxbury, Warwick, RI (US); Mohammad Moein Safaee, Kingston, RI (US); Mitchell Gravely, North Kingstown, RI (US)

(73) Assignee: University of Rhode Island Board of Trustees, Kingston, RI (US)

( * ) Notice: Subject to any disclaimer, the term of this patent is extended or adjusted under 35 U.S.C. 154(b) by 836 days.

(21) Appl. No.: 17/590,032

(22) Filed: Feb. 1, 2022

(65) Prior Publication Data
US 2022/0248983 A1    Aug. 11, 2022

Related U.S. Application Data

(60) Provisional application No. 63/146,440, filed on Feb. 5, 2021.

(51) Int. Cl.
*A61B 5/1455*    (2006.01)
*A61B 5/145*    (2006.01)
(Continued)

(52) U.S. Cl.
CPC ........ *A61B 5/1455* (2013.01); *A61B 5/14546* (2013.01); *A61F 13/00* (2013.01);
(Continued)

(58) Field of Classification Search
CPC .. A61B 5/1455; A61B 5/14546; C08K 3/041; A61F 13/00
See application file for complete search history.

(56) References Cited

U.S. PATENT DOCUMENTS 8,628,728 B2    1/2014 Kane et al.
11,124,897 B1 *    9/2021 Abudula .............. A61L 15/44
(Continued)

FOREIGN PATENT DOCUMENTS

WO    2011098575 A1    8/2011
WO    2016166731 A1    10/2016

OTHER PUBLICATIONS

Mostafalu, Pooria, et al., "Smart Bandage for Monitoring and Treatment of Chronic Wounds," Small, Smart Bandages, 2018.
Pal, Aniket et al., "Early detection and monitoring of chronic wounds using low-cost, omniphobic paper-based smart bandages," Biosensors and Bioelectronics, Elsevier-ScienceDirect, 117 (2018) 696-705.
(Continued)

*Primary Examiner* — Eric F Winakur
(74) *Attorney, Agent, or Firm* — Hinckley Allen & Snyder; Stephen Holmes (57) ABSTRACT

An optical core-shell microfibrous textile incorporates single-walled carbon nanotubes (SWCNTs) for the real-time optical monitoring of hydrogen peroxide concentrations and other biochemicals in in vitro wounds. The environmentally sensitive and non-photo-bleachable fluorescence of SWCNTs enable continuous analyte monitoring without a decay in signal over time. The microfibrous textiles spatially resolve chemical indicator concentrations using a camera and are integrated into commercial wound bandages without significant degradation in their optical properties.

19 Claims, 9 Drawing Sheets

(51) Int. Cl.
| | |
|---|---|
| *A61F 13/00* | (2024.01) |
| *C08K 3/04* | (2006.01) |
| *C08L 67/04* | (2006.01) |
| *C08L 71/02* | (2006.01) |
| *A61B 5/00* | (2006.01) |

(52) U.S. Cl.
CPC .............. *C08K 3/041* (2017.05); *C08L 67/04* (2013.01); *C08L 71/02* (2013.01); *A61B 5/445* (2013.01); *A61B 2562/0285* (2013.01); *A61F 2013/0094* (2013.01); *C08K 2201/011* (2013.01); *C08L 2203/12* (2013.01)

(56) References Cited

U.S. PATENT DOCUMENTS

| | | | | |
|---|---|---|---|---|
| 2010/0215724 | A1* | 8/2010 | Prakash | ................... A61K 9/06 977/750 |
| 2017/0007678 | A1* | 1/2017 | Zhang | ....................... A61K 9/06 |
| 2017/0299601 | A1 | 10/2017 | Giraldo Gomez et al. | |
| 2019/0056364 | A1 | 2/2019 | Lannutti et al. | |
| 2021/0325399 | A1* | 10/2021 | Martel | ................. G01N 33/582 |

OTHER PUBLICATIONS

Kamel, Azhar, "DsDNA-encased single walled carbon nanotubes (SWNTs) biosensor for detecting hydrogen peroxide in biological environment," Iraqi Journal of Biotechnology, 2017, vol. 16, No. 3, 31-45.

Zhang, Jingqing, et al., "Single Molecule Detection of Nitric Oxide Enabled by d(AT) DNA Adsorbed to Near Infrared Fluorescent Single-Walled Carbon Nanotubes," Journal American Chemical Society 2011, 133, 567-581.

Bhattacharya, Santanu et al., "DNA-SWCNT Biosensors Allow Real-Time Monitoring of Therapeutic Responses in Pancreatic Ductal Adenocarcinoma," American Association for Cancer Research, 2019.

Safaee, Mohammad Moein et al., "A Wearable Optical Microfibrous Biomaterial with Encapsulated Nanosensors Enables Wireless Monitoring of Oxidative Stress," Advanced Funct. Mater., 2021.

Lew, Tedrick Thomas Salim et al., "Real-time detection of wound-induced H2O2 signalling waves in plants with optical nanosensors," Nature Plants, vol. 6, Apr. 2020, 404-415.

Trafton, Anne, "Nanosensor can alert a smartphone when plants are stressed," MIT News, Aug. 21, 2020.

* cited by examiner

WEARABLE OPTICAL MICROFIBROUS MATERIAL WITH ENCAPSULATED NANOSENSORS FOR WIRELESS MONITORING OF CHEMICAL ANALYTES

CROSS-REFERENCE TO RELATED APPLICATIONS

This application is related to and claims priority from earlier filed U.S. Provisional Patent Application No. 63/146,440, filed Feb. 5, 2021, the entire contents of which are incorporated herein by reference.

GOVERNMENT LICENSE RIGHTS

This invention was made with government support under GM103430 awarded by the National Institutes of Health and 1655221 and 1844536 awarded by the National Science Foundation. The government has certain rights in the invention.

BACKGROUND OF THE DISCLOSURE

The present disclosure relates generally to optical microfibrous materials containing chemical detecting nano-sensors. More specifically, the present disclosure relates to a wearable micro-fibrous material that contains embedded nano-sensors to detect chemical markers in real-time, demonstrating the capability of the platform for monitoring in complex biological environments.

Reactive oxygen species (ROS) are continuously generated and consumed in all eukaryotic and prokaryotic cells as a consequence of aerobic life. In this biological context, ROS primarily function to preferentially react with specific atoms of biomolecules involved in a wide range of physiological processes. ROS play a crucial role in biological signaling including the inhibition or activation of proteins, subsequent promotion or suppression of inflammation, immunity, and carcinogenesis. Oxidative stress can occur if the ROS-induced signal is too strong, if it persists for too long, or if it occurs at the wrong time or place.

As a key example, wound healing is one of the most dynamic biological processes involving ROS-linked cellular signaling throughout the entire mechanism. Additionally, basal concentrations of ROS aid in the fight against invading microorganisms into open wounds. The excessive and uncontrolled production of ROS contributes to the sustaining and deregulation of inflammation processes, which plays a central role in the pathogenesis of chronic non-healing wounds. Physiologically, hydrogen peroxide (referred herein as peroxide) and superoxide function as intracellular ROS messengers stimulating key phases of wound healing including cell recruitment, production of cytokines, and angiogenesis. Of note, peroxide acts as the principal secondary messenger in wound healing and is present at low concentrations (100-250 $\mu M$) in normal wounds. Increased peroxide concentration is a biomarker for inflammation and chronicity in which biofilm-forming pathogens can grow significantly faster than acute wounds. Interestingly, strictly controlling the ROS levels through antioxidants has recently been shown to improve inflammatory skin conditions and wound healing process in diabetic and hypoxic environments.

Due to the short half-lives of ROS, the direct detection and quantification of their concentrations are often difficult in the laboratory and in patients. Although multiple classes of sensors and spectrophotometric assays have been developed to monitor various types of ROS, the current methods are limited in their capabilities. Spectrophotometric methods, such as total antioxidant capacity assays (TAC), and gel electrophoresis have been utilized to indirectly determine the oxidation products of lipids, proteins and DNA, but these are not capable of real-time monitoring in the wound site. Various label-free electrochemical biosensors have also been developed to accurately quantify the ROS concentrations by immediately converting the chemical information to an electrical signal. The main drawback of electrochemical techniques is the requirement to incorporate electrodes into different biomaterials and wireless platforms. Moreover, the need to utilize an electrochemical signal transducer restricts the application of the current sensors on wounds in different organs of the body. Fluorescent nanoparticles and genetically encoded fluorescent molecules that are highly selective for peroxide have been created to study the redox events in mice, zebrafish, and cells, but these assays cannot be utilized for real-time monitoring in clinical applications. Therefore, developing a point-of-care diagnostic technology for the real-time monitoring of ROS concentrations in wound sites is essential to prevent chronicity and infection, and to deliver accurate amounts of antioxidants and antibiotics to the wounds.

Single-walled carbon nanotubes (SWCNTs) with engineered wrappings have recently been developed and utilized in various disparate fields ranging from additives that strengthen material composites to biomedical applications including near-infrared (NIR) optical biosensing, and biological imaging. The electronic band gap energies of SWCNTs are dependent on their chiral identity, denoted by integers (n,m), and vary based on diameter and rollup angle, resulting in various semiconducting species which exhibit a distinct narrow-bandwidth photoluminescence in the second NIR window. The SWCNT photoluminescence responds to their local environment, resulting in shifts in emission wavelengths and/or variations in intensity. Certain amphiphilic polymers such as short single-stranded deoxyribonucleic acids (ssDNA), Phospholipid-Polyethylene glycol (PL-PEG), and synthetic polymers have all been shown to effectively solubilize SWCNTs, imparting enhanced biocompatibility and desirable fluorescence properties. The resultant hybrid nanomaterials have been optimized for the detection of a wide range of analytes in vivo and in vitro including neurotransmitters, lipids, and proteins. SWCNT-based optical nano-sensors have also recently been developed for real-time spatial and temporal monitoring of ROS in various plant species as a biomarker for plant health. Moreover, ratiometric SWCNT-based optical sensors have enabled the real-time monitoring of ROS in plants, allowing an absolute calibration independent of overall intensity. The current ratiometric sensing approaches based on SWCNTs require separation of at least two highly pure single chiralities, wrapped in two different polymers, where one polymer-chirality pair is sensitive to the local environment and the other pair does not spectrally respond to the variations in the local environment and acts as a reference.

Although the ssDNA- and polymer-wrapped SWCNT nano-sensors have attracted significant interest in the past decade for biosensing applications in vivo and in vitro, the integration of these biosensors into other bulk biomaterial platforms has been a challenge as their NIR fluorescence is remarkably sensitive to the chemistry of their local environment and can be suppressed by other components in the biomaterial preparation processes. Moreover, due to the hydrophilicity of these nano-sensors, it is unfavorable to engage them in any process involving organic solvents as they form bulk aggregates in hydrophobic environments.

BRIEF SUMMARY OF THE DISCLOSURE

In recent years, an extensive range of smart wound care biomaterials have been developed that enable localized delivery of drugs on the wound site and real-time monitoring of the wound microenvironment. Electrospun microfibers are one of the novel classes of wound dressings as they mimic the chemical and mechanical environment of the 3D extracellular matrix. Microfiber-based wound dressings have been designed to enhance cell migration, prevent inflammation and infection, and inhibit scar formation on wounds. Nevertheless, the current state of the art lacks an effective microfibrous, biomaterial which is both biocompatible and capable of sufficiently fluorescing to allow in-situ optical measurement of certain wound analytes.

The unique in-situ environment of wounds creates several challenges for development of optically active, wearable microfibrous materials. While functionalized SWCNT sensors can sufficiently fluoresce within certain polymers there is a delicate balance in encapsulating the functionalized SWCNTs within a core-shell microfiber so that they are both biocompatible and functional.

As noted above, it is not desirable for the SWCNTs to escape from the core-shell into the environment. Accordingly, the core-shell must be capable of retaining the SWCNT within the core-shell structure and yet also be biocompatible, i.e. soluble to some extent but not sufficiently soluble so that the SWCNT can escape into the wound site. The core-shell must also have some level of porosity to allow the targeted analyte to be absorbed into the core-shell materials so that it can react with the functionalized SWCNTs.

Many prior art core-shell nanofibers for sensing analytes in a gas environment had very thin core-shell structures. These thin-walled structures allowed the gas to pass into the structure and react with the functionalized SWCNT's and also allowed optical sensing without much optical interference from the core-shell structure itself. However, as noted above, the unique in-situ wet environment in an active wound dressing changes those parameters. The prior art microfibers were too easily solubilized and thus capable of releasing the SWCNTs into the wound site, and were further too thin, allowing other analytes to interfere with and quench the optical fluorescing of the sensors.

Accordingly, there is a need for a unique core-shell nanofiber with functionalized SWCNT sensors which features a core-shell morphology in which the SWCNTs are encapsulated sufficiently inside of a polymer shell to prevent escape within a wound site but yet is still sufficiently porous to allow analyte reaction and optically active to allow detection.

There is still a further need for a wearable optical microfibrous bandage material or textile which is capable of detecting various wound analyte indicators, such as peroxide, in a physiologically relevant range for wounds (1-250 µM), without the requirement to embed any electronics or power sources within the textile itself.

There is yet a further need for a wearable optical textile that spatially resolves the peroxide concentrations using hyperspectral fluorescence microscopy, that provides a microfibrous platform as a conventional wound bandage and that demonstrates the feasibility of in situ measurements of peroxide, and other chemical analytes in wounds and other biological environments.

In this regard, the present disclosure, in one exemplary embodiment provides a process to fabricate wearable microfibrous textiles incorporating peroxide sensing SWCNTs. In a further embodiment, electrospun fibers that feature a core-shell morphology in which the SWCNTs are encapsulated inside of a polymer shell that is soluble in an organic solvent are disclosed. In still a further embodiment, a wearable optical platform able to wirelessly and reversibly detect peroxide in a physiologically relevant range for wounds (1-250 µM), without the requirement to embed any electronics or power sources within the textile itself is provided. A further embodiment provides for optical textiles that spatially resolve the peroxide concentrations using hyperspectral fluorescence microscopy that provides a microfibrous platform as a conventional wound bandage and demonstrated the feasibility of in situ measurements of peroxide in wounds. Finally, an alternate embodiment provides a process to fabricate wearable microfibrous textiles incorporating dopamine sensing SWCNTs.

The present disclosure utilizes a one-step co-axial electrospinning process to fabricate microfibers incorporating peroxide-sensing SWCNTs and having fiber diameters in the range of 0.2 µm to 30 µm, with a core diameter size range of 0.1 µm to 20 µm and a shell thickness size range of 0.1 µm to 10 µm. More preferably, the fiber diameters are in the range of 5 µm to 10 µm, with a core diameter size range of 1 µm to 3 µm and a shell size range of 4 µm to 7 µm. These dimensions are much larger scale than the prior art fibers. The density of the functionalized SWCNT's within the fibers is preferably in the range of 0.001 wt/wt % to 0.0005 wt/wt % (percentage concentration–weight/weight %) (weight of SWCNT/(weight of SWCNT+total weight of core and shell polymers)), with exemplary embodiments having a density of 0.00070767 wt/wt %.

The electrospun fibers feature a core-shell morphology in which the SWCNTs are encapsulated inside of a biocompatible, biodegradable, bioresorbable polymer shell that is soluble in an organic solvent. Preferably, polycaprolactone (PCL) is employed as the shell material, as it is an FDA-approved polymer which has been extensively studied for tissue engineering and wound healing applications. Polycaprolactone is a biocompatible, biodegradable, bioresorbable polymer, an aliphatic polyester belonging to the poly-α-hydroxy acid group, in the same chemical group as polylactic and polyglycolic acids.

Utilizing confocal Raman microscopy, it has been found that the functionalized SWCNT nanosensors stay encapsulated within the individual fibers for up to at least 21 days, indicating that the long-term identity of the nanosensing platform is maintained.

Using SWCNT's functionalized with a single stranded (GT)15 DNA, the wearable optical platform is able to wirelessly and reversibly detect peroxide in a physiologically-relevant range for wounds (1-250 µM), without the requirement to embed any electronics or power sources within the textile itself. The ratiometric characteristic of the NIR fluorescence sensor facilitates in vivo and clinical applications as it transduces an absolute signal that is not dependent on excitation source distance nor exposure time. Moreover, the optical textiles are able to detect peroxide in real-time in the presence of peroxide-producing macrophages, demonstrating the capability of the platform for ROS monitoring in complex biological environments. Also indicated is potential of the optical textiles for spatially resolving dopamine concentrations, using a SWCNT functionalized with a single stranded (GT)6 DNA and using hyperspectral fluorescence microscopy.

These together with other objects of the invention, along with various features of novelty which characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

In the drawings which illustrate the best mode presently contemplated for carrying out the present invention:

FIGS. 7a-7d show calibrating the optical microfibrous textiles for continuous peroxide detection. (a) Two-dimensional heat-map illustrating the ratiometric signal as a function of both concentration and time. (b) Ratiometric signal as a function of time for each peroxide concentration. The dashed lines indicate single exponential association fits. (c) Pre-exponential factors extracted from the single exponential association fits and plotted as a function of peroxide concentration. The dashed line indicates a power function fit. (d) Contour plot demonstrating a two-dimensional calibration curve where the fitted ratiometric signal is a function of both time and concentration. Mean values were obtained by adding each peroxide concentration to three different samples (n=3), and error bars represent the standard deviation;

FIGS. 9a-9d show the fluorescence of SWCNTs is detectable by a spectrometer through the bandage. (b) Comparison of the fluorescence spectra of microfibers alone, through adhesive bandage material, or through both adhesive material plus an adsorbent pad (complete bandage). (c) Comparison of the ratiometric signals of the three conditions mentioned in part b, after being soaked in PBS over time. Mean values were obtained by acquiring the fluorescence spectra from three different samples (n=3) per each condition. The error bars represent standard deviation. Two-sample t-tests were performed on the data (*, $p<0.05$, **, $p<0.01$). (d) Real-time wireless fluorescence spectra readout utilizing the flexible optical microfibers attached onto a commercial bandage;

DETAILED DESCRIPTION OF THE DISCLOSURE

Prior to a detailed discussion of the embodiments of the invention, it is to be understood that the present disclosure and invention are not limited in its application to the details of construction and the arrangement of components set forth in the following description or illustrated in the following drawings. The invention is capable of other embodiments, and of being practiced or of being carried out in various ways.

It is also to be understood that the phraseology and terminology used herein is for the purpose of description and should not be regarded as limiting. The use of "including," "comprising," or "having and variations thereof herein is meant to encompass the items listed thereafter and equivalents thereof as well as additional items. Unless specified or limited otherwise, the terms "mounted," "connected," "supported," and "coupled and variations thereof are used broadly and encompass both direct and indirect mountings, connections, supports, and couplings. Further, "connected and" coupled are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Now referring to the drawings, an exemplary embodiment of a wearable microfibrous textile incorporating a functionalized SWCNTs is disclosed along with a process to fabricate such a wearable microfibrous textile. In a further embodiment, electrospun fibers that feature a core-shell morphology in which the SWCNTs are encapsulated inside of a polymer shell that is soluble in an organic solvent are disclosed. In still a further embodiment, a wearable optical platform able to wirelessly and reversibly detect peroxide in a physiologically relevant range for wounds (1-250 µM), without the requirement to embed any electronics or power sources within the textile itself is provided. A further exemplary embodiment provides for optical textiles that spatially resolve the peroxide concentrations using hyperspectral fluorescence microscopy that provides a microfibrous platform as a conventional wound bandage and demonstrated the feasibility of in situ measurements of peroxide in wounds. Finally, an alternate embodiment provides a process to fabricate wearable microfibrous textiles incorporating dopamine sensing SWCNTs.

Figure 1:
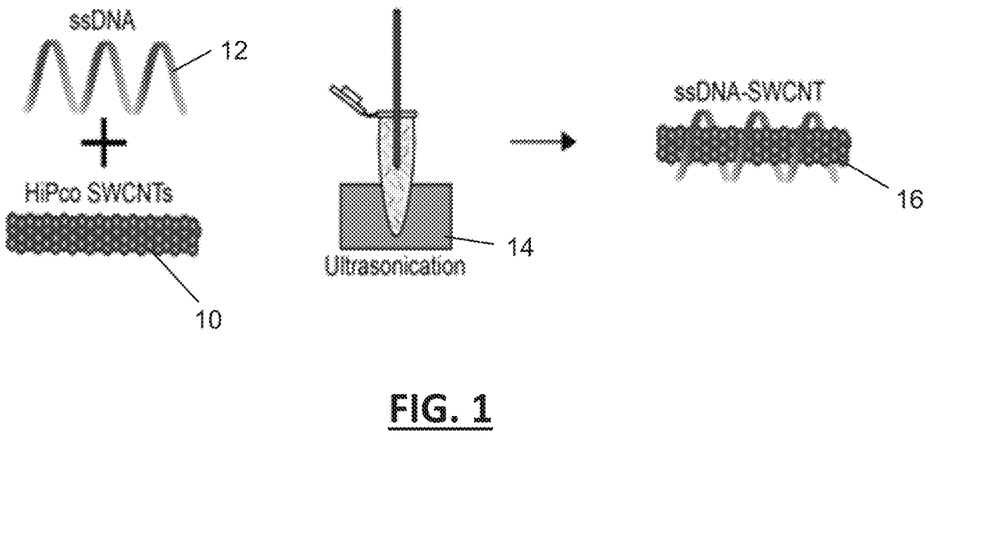
FIG. 1 illustrates nanosensor preparation by probe-tip sonicating SWCNTs in the presence of ssDNA followed by ultracentrifugation of the resultant dispersion.
Figure 2:
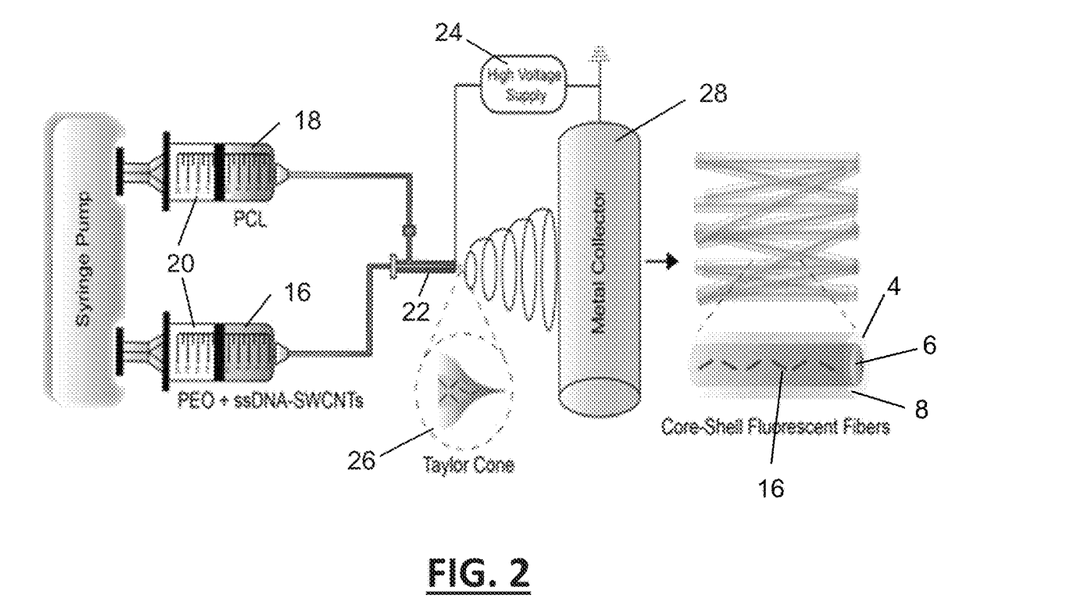
FIG. 2 illustrates core-shell electrospinning setup for fabrication of the optical microfibrous textiles. The two syringes containing the core and shell polymer solutions are connected to the inlets of a custom core-shell needle. Once the polymer solutions are injected out, a core-shell pendant droplet is formed. A high-voltage supply is connected to the tip of the needle and electrifies the droplet, forms a Taylor cone, and eventually elongates the cone until microfibers are created. The resultant fibers are collected onto a rotating metal grounded collector.
Figure 2A:
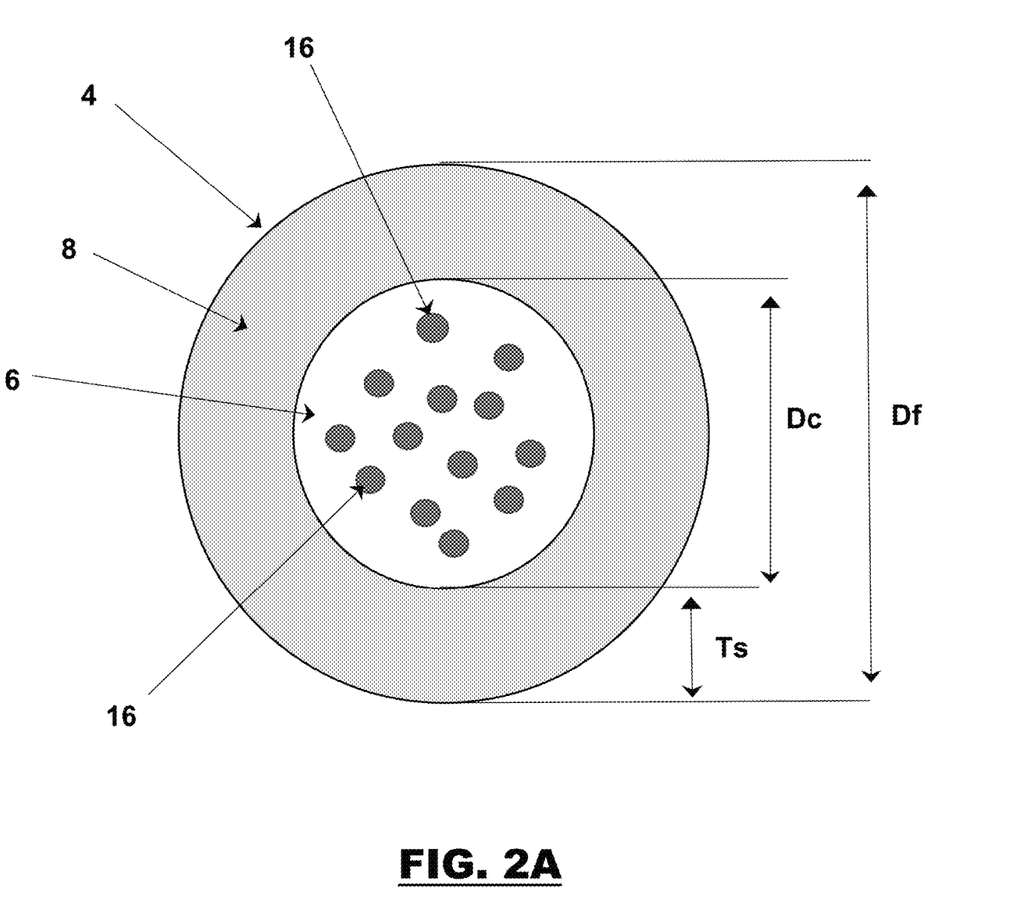
FIG. 2A is a cross-section of an optical microfiber in accordance with the present disclosure.
Figure 3A:
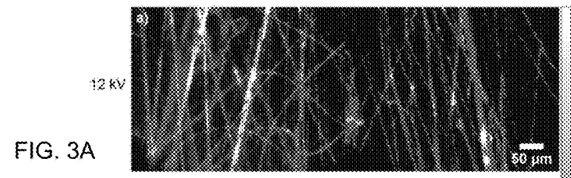
FIGS. 3a-3F illustrate NIR broadband fluorescence images of microfibers produced with the applied voltages of (a) 12 kV, (b) 14 kV, and (c) 16 kV. The microfibers were illuminated with a 730 nm laser and images were acquired with a 2D InGaAs array detector in the wavelength range 900-1400 nm. SEM images of the fibers fabricated with applied voltages of (d) 12 kV, (e) 14 kV, and (f) 16 kV.
Figure 3B:
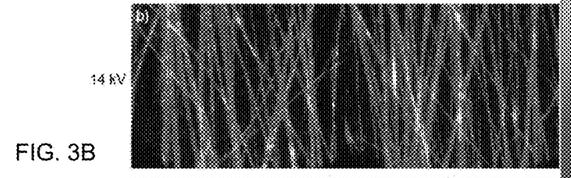
Figure 3C:
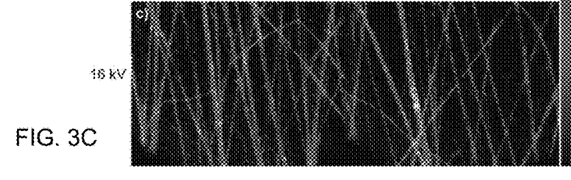
Figure 3D:
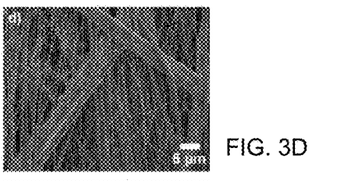
Figure 3E:
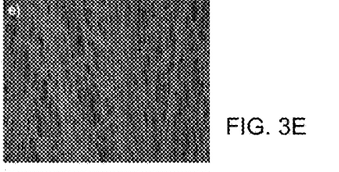
Figure 3F:
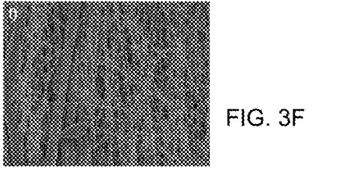

Turning now to FIGS. 1, 2 and 2A, the formation of optical microfibers 4 is shown as being prepared via probe-tip sonicating SWCNTs 10 in the presence of ssDNA 12 followed by ultracentrifugation of the resultant dispersion. Aqueously dispersed ssDNA-SWCNT nanosensors 16 are prepared by probe-tip sonicating HiPco SWCNTs in the presence of single-stranded $(GT)_{15}$ DNA. The $(GT)_{15}$ sequence was selected for formation of the SWCNT-based nanosensors 16 as this sequence of DNA has been utilized in live cells and plants for the real-time and selective monitoring of peroxide, in contrast to other signaling molecules which include nitric oxide (NO), super oxide ($[O_2]\cdot^-$), singlet oxygen ($^1O_2$) and hydroxyl radical ($[OH]\cdot$). Following sonication, the sample is ultracentrifuged to remove bundles of undispersed functionalized SWCNTs 16 as well as residual catalyst particles to produce an ink-like solution with strong NIR absorbance and fluorescence spectra.

ssDNA-SWCNT Nanosensor Preparation: Raw single-walled carbon nanotubes 10 produced by the HiPco process (1 mg, Nanointegris) were added to desalted $(GT)_{15}$ oligonucleotide 12 (2 mg, Integrated DNA Technologies) in a microcentrifuge tube 14 with NaCl solution (1 mL, 0.1 M, Sigma-Aldrich). The mixture was then ultrasonicated using a ⅛" tapered microtip (Sonics Vibracell; Sonics & Materials) for 30 min at 40% amplitude, with an average power output of 8 W, in a 0° C. temperature-controlled microcentrifuge tube holder. After sonication, the dispersion was ultracentrifuged twice (Sorvall Discovery M120 SE) for 30 min at 250 000×g, and the top 80% of the supernatant was extracted. The resultant dispersion was filtered using 100 kDa Amicon centrifuge filters (Millipore) to remove free ssDNA. A UV/vis/NIR spectrophotometer (Jasco, Tokyo, Japan) was utilized to determine the concentration using the extinction coefficient of $A_{910}$=0.02554 L mg$^{-1}$ cm$^{-1}$.

The following alternative materials and applications of the disclosure have been investigated and should be contemplated and considered within the scope of the disclosure. Nanosensor alternatives include use of non-covalently wrapped single-walled carbon nanotubes. Nanotube engineered wrappings alternatives include the following materials: Oligonucleotide, Peptide/protein, Carbohydrate, Synthetic polymer, Antibodies, Nanobodies, DNA/RNA aptamers and combinations thereof To create colloidally stable nanosensor fibers 4, a core-shell electrospinning procedure, as shown at FIG. 2, is employed to encapsulate the hydrophilic ssDNA-SWCNTs 16 along with polyethylene oxide (PEO) (core polymer) into the polymer polycaprolactone (PCL) 18 (shell polymer), that is soluble in an organic solvent. Briefly, the shell 8 and core 6 are extruded from two syringes 20 containing the core and shell polymer solutions.

Preferably, polycaprolactone (PCL) is employed as the shell polymer, as it is an FDA-approved polymer which has been extensively studied for tissue engineering and wound healing applications. Polycaprolactone is a biocompatible, biodegradable, bioresorbable polymer, an aliphatic polyester belonging to the poly-α-hydroxy acid group, in the same chemical group as polylactic and polyglycolic acids.

Shell polymers may include the use of: Polyurethane (PU), Polycarbonate (PC), Nylon, Polystyrene, Polytetrafluoroethylene (PTFE), Polylactic acid (PLA), Polymethyl methacrylate (PMMA), Polyaniline (PANI), Polyacrylonitrile (PAN), Polylactic-co-glycolic acid (PLGA), Polydimethylsiloxane (PDMS) and combinations thereof.

Polyethylene oxide (PEO) is indicated as an exemplary core polymer. Alternatives may also include the use of the following core polymers: Polyvinyl alcohol (PVA), Polyvinylpyrrolidone (PVP), Collagen, Gelatin, Chitosan, Alginate, Polyacrylic acid (PAA), Polyacrylamides, Dextran, Cellulose, Hyaluronic acid (HA), Starch, Glycerol and combinations thereof.

The syringes are connected to the inlets of a custom core-shell needle 22. Once the polymer solutions are injected, a core-shell pendant droplet is formed. A high-voltage supply 24 is connected to the tip of the needle 22 and electrifies the droplet, forms a Taylor cone 26, and eventually elongates the cone until microfibers 4 are created. The resultant fibers 4 are collected onto a rotating metal grounded collector 28. After rapid solvent evaporation, the immiscibility of the core 6 and shell 8 causes complete encapsulation of the core 6 within the shell 8.

The present disclosure utilizes a one-step co-axial electrospinning process to fabricate microfibers incorporating peroxide-sensing SWCNTs and having fiber (Df) diameters in the range of 0.2 μm to 30 μm, with a core size (Dc) range of 0.1 μm to 20 μm and a shell thickness (Ts) range of 0.1 μm to 10 μm. More preferably, the fiber diameters are in the range of 5 μm to 10 μm, with a core thickness size range of 1 μm to 3 μm and a shell size range of 4 μm to 7 μm. These dimensions are much larger scale than the prior art fibers. The density of the functionalized SWCNT's within the fibers is preferably in the range of 0.001 wt/wt % to 0.0005 wt/wt % (percentage concentration–weight/weight %) (weight of SWCNT/(weight of SWCNT+total weight of core and shell polymers)), with exemplary embodiments having a density of 0.00070767 wt/wt %.

In this process, the hydrophilic ssDNA-SWCNT nanosensors 16 are protected against a prolonged interaction with an organic solvent. Additionally, the intrinsic NIR fluorescence of the nanosensors is maintained, as the process does not introduce any other chemicals such as crosslinking agents. There are a number of physical parameters involved in the electrospinning process which control the reproducibility and homogeneity of the final samples. The flow rates of the polymers, rotation rate of the collector, and the distance between the needle and collector are optimized to achieve a stable electrospinning jet.

Example 1

Fabrication of Electrospun Optical Microfibrous Textiles: A one-step co-axial electrospinning process was used to produce core-shell fibers 4. A customized core-shell needle (Rame-hart Instrument co.) with two separate inlets was built by placing a 24 Gauge needle inside of a 15 Gauge needle. The inlets of the needle were connected to two syringes filled with the polymer solutions and placed on a syringe pump capable of controlling the flow rates separately. The flow rates of the core and shell solutions were set to 0.3 and 2 mL h−1, respectively. A high voltage supply was connected to the tip of the needle and the rotating collector was grounded. The working distance between the needle and collector was set to 12 cm. To fabricate bulk fibrous textiles with a thickness of ~0.7 mm, the fibers were continuously collected on the metal collector for 7 hours. To prepare samples for NIR and confocal Raman microscopy, microscope coverslips were taped to the surface of the collector and a thin layer the fibers were collected on the coverslips for 10 minutes.

Preparation of Core and Shell Polymer Solutions: A 4 wt. % poly(ethylene oxide) (PEO, $M_v$=900,000 g mol$^{-1}$, Sigma-Aldrich) solution was prepared by dissolving PEO in DI water and stirring the solution overnight on a hotplate set to 48° C. A concentrated ssDNA-SWCNT dispersion (~400-500 mg L$^{-1}$) was prepared by filtering out the as-prepared ssDNA-SWCNT dispersion using an Am icon filter (100 kDa) and resuspending it in a lower volume of NaCl solution (0.1 M). The concentrated dispersion was then diluted in the resultant PEO solution to obtain a homogenous nanotube concentration of 10 mg L$^{-1}$. Because of the high ssDNA-SWCNT concentration, the final concentration of the PEO solution was not significantly altered by adding ssDNA-SWCNT dispersion to it. Polycaprolactone (PCL, $M_w$=70,000 g mol$^{-1}$, Scientific Polymer Products, Inc.) was dissolved in a mixture of chloroform and dimethylformamide (DMF) with the volume ratio of 80:20, by stirring the solution for 6 hours at room temperature, to obtain a final PCL concentration of 13 wt. %.

To optimize the morphology of the fibers 4 and aggregation state of the nanosensors 16, the voltage applied during the electrospinning process is tuned. FIG. 3 demonstrates NIR broadband fluorescence images (900-1400 nm) and scanning electron microscopy (SEM) images of fibers produced with three different voltages. The applied voltage of 12 kV did not provide a high enough rate of elongation, and as a result, SWCNT aggregates appeared in the NIR fluorescence images. When the applied voltage was 16 kV, occasional aggregates again emerged along the fibers, presumably due to incomplete formation of the Taylor cone. An applied voltage of 14 kV produced a homogenous fiber morphology with no significant spatially localized aggregations. The SEM images of the fibers produced with the three voltages revealed two subsets of fibers with diameters of more than ~1 μm or less than ~100 nm. By visually comparing the SEM and NIR fluorescence images, it can be observed that the diameter range of the NIR optical fibers is identical to the micron-size fibers in the SEM images. The microfibers were illuminated with a 730 nm laser and images were acquired with a 2D InGaAs array detector in the wavelength range 900-1400 nm. Thus, although we have produced a matrix of micro- and nanofibers, we acknowledge the fact that the optically-active fibers have sizes of more than 1 μm.

Figure 4A:
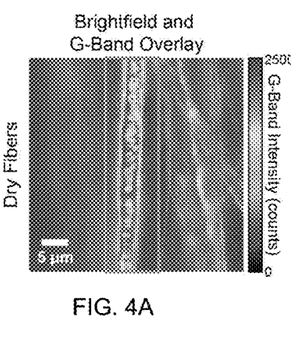
FIGS. 4a-4f show Confocal Raman microscopy of dry fibers and fibers soaked in PBS for 7 days. (a) and (d) The representative overlay of G-band intensity and brightfield images of dry fibers and fibers soaked in PBS for 7 days, respectively. (b) and (e) k-means clustering analysis of all spectra in each area scan, where k=4 clusters (background cluster omitted from figure). (c) and (f) The average Raman spectra obtained from each cluster of (b) and (e)
Figure 4B:
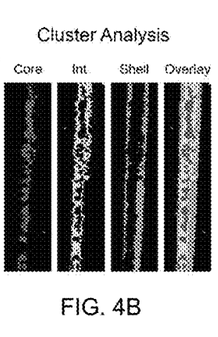
Figure 4C:
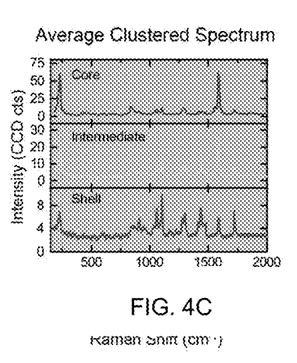

Confocal Raman microscopy was employed to confirm the core-shell morphology and assess the complete encapsulation of nanosensors within the individual fibers. Confocal Raman microscopy is a powerful technique used to analyze multicomponent material samples, in which the unique Raman spectrum of each component can be identified and spatially resolved. SWCNTs exhibit distinct Raman signatures such as the G-band (1589 cm$^{-1}$), which proportionately scales with increasing amounts of graphitic carbon (i.e. SWCNT concentration), and the radial breathing mode (150-350 cm$^{-1}$), which can identify the chiral composition of a SWCNT mixture. FIG. 4 displays the brightfield and G-band intensity overlay of a single as-produced fiber. A k-means clustering analysis was applied to the entire dataset, in which the spectrum from each pixel was partitioned into one of 4 clusters (k=4) based on the location and intensity of individual peaks, creating 4 average spectra which best represented all regions, including the background, from the Raman area scan (FIG. 4*a-c*). Based on the clustering analysis, each individual fiber was categorized to three areas: core, intermediate, and shell (background constituted the fourth cluster). The average Raman spectrum of the core area corroborated previous reports of SWCNT Raman spectra (FIG. 4*c*). The average Raman spectrum of the shell area predominantly matched with the spectrum from the PCL polymer with two additional peaks at ~1589 and 240 cm$^{-1}$, which can be correlated to small quantities of SWCNTs. However, it is worth noting that SWCNTs benefit from signal enhancement due to resonance Raman scattering,[66] and thus the intensity of their peaks in the shell clusters could over-represent their actual quantity with respect to PCL. Interestingly, the average Raman spectrum from the intermediate area features spectral characteristics from both SWCNTs and PCL polymer, indicating an area of heterogeneity at the core-shell interface. These results demonstrate that the highest density of the nanosensors reside in the core area of the fibers, while their Raman signal diminishes in the outward radial direction and the main component becomes the polymer shell. Although the spectral characteristics of the PEO polymer are not apparent in the Raman spectra of the three areas, they are presumably dominated by the enhanced Raman signal of the SWCNTs. Moreover, the Raman spectra of the PCL and PEO polymers show minimal overlap with the G-band and RBM peaks from SWCNTs, indicating that the identified SWCNT signal contains no contribution from the other nanofiber components.

Figure 4D:
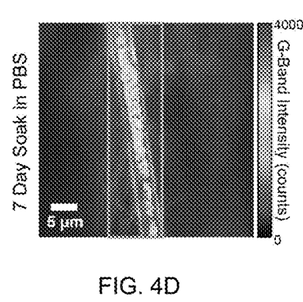
Figure 4E:
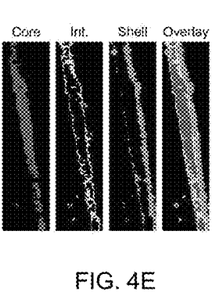
Figure 4F:
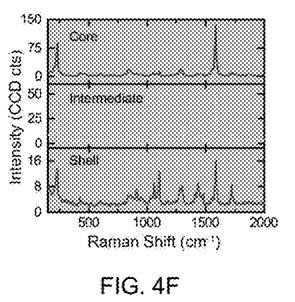

To assess the ability of individual fibers to preserve the nanosensors over time, we soaked the fiber samples in phosphate buffered saline (PBS) solution and performed confocal Raman microscopy at different timepoints. FIG. 4d indicates that the SWCNTs remain encapsulated within individual fibers after 7 days, without forming noticeable aggregates or any deformation in the fiber structure. Moreover, k-means clustering analysis identified the same spectral characteristics for the three identified areas (core, intermediate and shell) at different time points, further demonstrating that the fibers retain their entire structural integrity in an aqueous environment (FIGS. 4e and f).

To quantify the amount of the released nanosensors from a bulk fibrous matrix, the microfibrous textiles with thickness of ~0.7 mm were cut to 1 square inch pieces and soaked in PBS. We collected the PBS solutions over time for up to 21 days and acquired their Raman spectra. Comparing the Raman spectra of the released nanosensors with that of three standard samples with known concentrations (0.01, 0.1, 1 mg L$^{-1}$), the lack of G-band signal indicates that the released nanosensors fall within the noise range of our Raman spectrometer. We conclude that over the course of at least 21 days, a negligible amount of the nanosensors are released from the fibers.

Ratiometric Peroxide Detection Using Optical Microfibrous Textiles

Figure 5A:
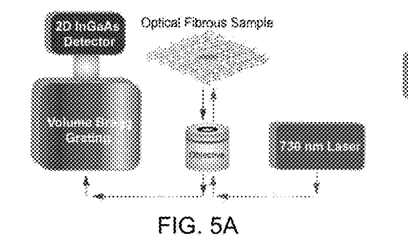
FIGS. 5a-5g show (a) The schematic of the optical setup utilized to obtain the hyperspectral NIR fluorescence intensity images from the microfibers. (b) The schematic of the probe NIR fluorescence spectrometer utilized to obtain the fluorescence spectra from bulk microfibrous samples. (c) (9,4), (d) (8,6) and (e) (8,7) chirality intensity images, obtained using the system shown in part a. (f) The fluorescence spectra of the microfibrous samples exposed to various peroxide concentrations, obtained from the system shown in part b. (g) The fluorescence spectra shown in part d were normalized by their max intensity.
Figure 5B:
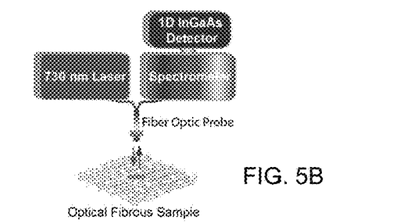
Figure 5C:
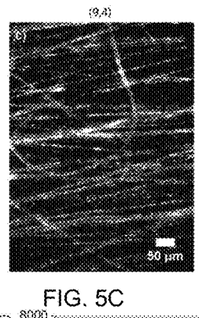
Figure 5D:
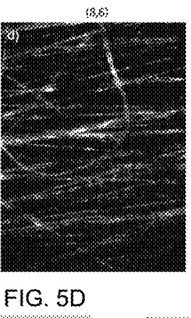
Figure 5E:
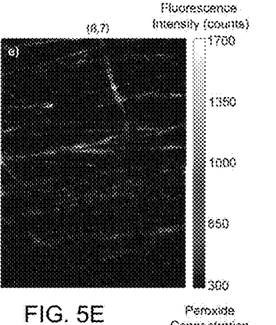
Figure 5F:
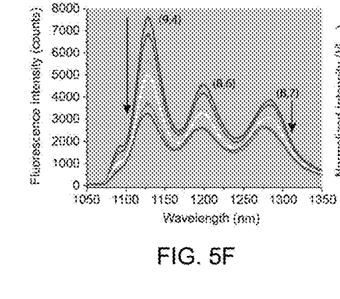
Figure 5G:
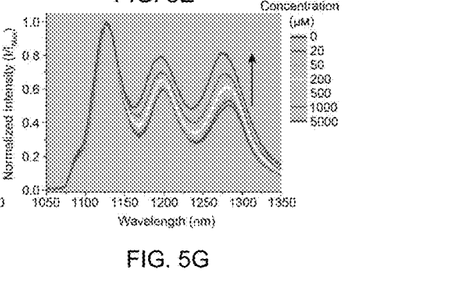

The HiPco SWCNTs contain multiple chiralities emitting NIR fluorescence in the range of 900-1400 nm. As both chirality and DNA sequence determine the spectral responses of SWCNTs to their local environment, certain chiralities of SWCNTs within the HiPco sample respond to hydrogen peroxide due to their differing bandgaps energies. We first acquired NIR hyperspectral fluorescence images of the fluorescent fibers containing (GT)$_{15}$-SWCNTs using the optical setup illustrated in FIG. 5. FIGS. 5c-e indicate the fluorescence intensity of three different chiralities in the same fiber sample, i.e. the (9,4), (8,6), and (8,7)-SWCNT chiralities. To test the environmental sensitivity of the optical fibers to peroxide, we exposed the bulk microfibrous samples (area: 0.5 mm$^2$, thickness: ~0.7 mm) to various concentrations of peroxide and acquired fluorescence spectra after 24 hours, utilizing a probe NIR fluorescence spectrometer (FIG. 5b), which enabled the resolution of the three mentioned chiralities. FIG. 5f reveals that the three chiralities quench upon exposure to peroxide, however, the extent of quenching varies significantly among the chiralities. By normalizing each plot by its maximum intensity (i.e. the intensity of the (9,4) chirality), we observe that the normalized (8,6) and (8,7) peaks monotonically intensify with increasing peroxide concentration, illustrating that a ratiometric signal can be obtained for peroxide detection (FIG. 5g). We selected the (8,7)/(9,4) intensity ratio to further calibrate a biosensor for peroxide detection as it appears to be more sensitive to peroxide concentrations compared to the (8,6)/(9,4) ratio.

Calibrating the Microfibrous Textiles for Peroxide Detection

Figure 6A:
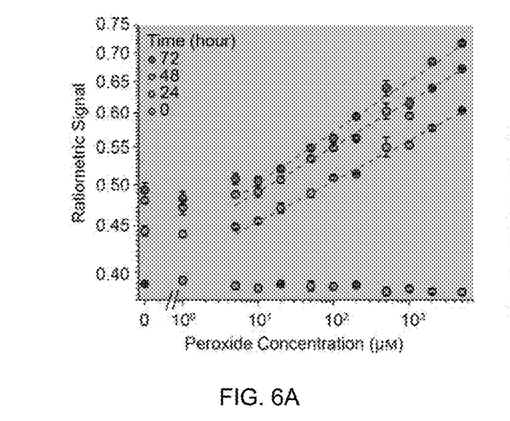
FIGS. 6a-6b (a) illustrate a calibration curve showing the ratiometric signal, i.e. (8,7) intensity divided by (9,4) intensity, as a function of peroxide concentration at three different time points. Mean values were obtained by adding each peroxide concentration to three different samples (n=3), and error bars represent the standard deviation. (b) Two phenomena governing the temporal dependence of the peroxide calibration curve; (I) The diffusion of peroxide molecules through the 3D matrix of fibers and through the shell to reach to the ssDNA-SWCNTs in the core of the individual fibers. (II) Due to the ionic strength of the surrounding environment, the ssDNA on the surface of nanotubes undergoes a conformational change over time and forms a more compact wrapping around the nanotubes. As a result of these two phenomena, the NIR fluorescence of SWCNTs and the ratiometric signal are altered over time.
Figure 6B:
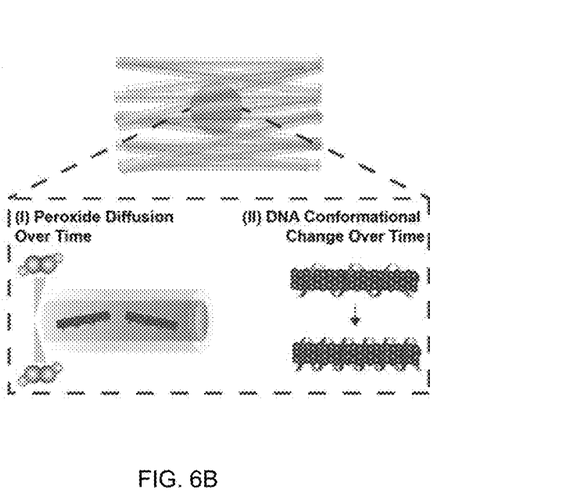

To obtain a calibration curve for aqueous peroxide detection, we exposed the initially dry microfibrous samples to various concentrations of peroxide ranging from 1 μM to 5 mM and monitored the samples over time for up to 72 hours. FIG. 6a demonstrates that all samples produced the same initial ratiometric signal, clarifying the reproducibility of our method for fabricating bulk samples of optical fibers encapsulating nanosensors. After 24 hours, a concentration-dependent ratiometric signal was obtained from the samples. While 0 to 5 μM peroxide gave no significant change in the ratiometric signal, it monotonically increased with peroxide concentration in the range of 5 μM to 5 mM and could be fit to a linear function with R$^2$=0.99 on a log-log scale of signal vs. concentration. When examined at 48 and 72 hours after the addition of peroxide, the ratiometric signal systematically increases while maintaining the trend in the calibration curve. The data can still be fit to a linear function in the range of 5 μM to 5 mM. To explain the time dependency of the calibration curves, we propose that the noncovalently wrapped DNA adopts more compact conformations on the SWCNT surfaces over time as they progressively interact with ions, mainly sodium, in the PBS. This rearrangement alters the fluorescence intensity in a chirality-dependent fashion, and thus the ratio of the peaks over time, regardless of peroxide concentration. Moreover, the diffusion of the peroxide molecules through the pores in the 3D matrix and through the free spaces in between the polymer chains on the shell is a time-dependent process, so it will result in further fluorescence quenching over time.

Figure 7A:
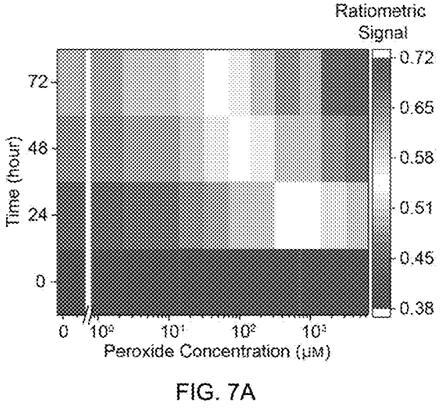
Figure 7B:
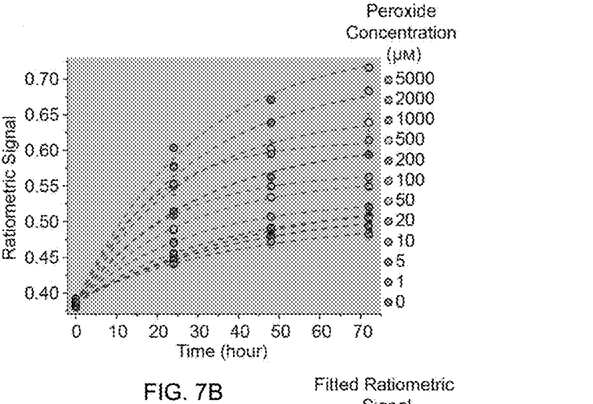
Figure 7C:
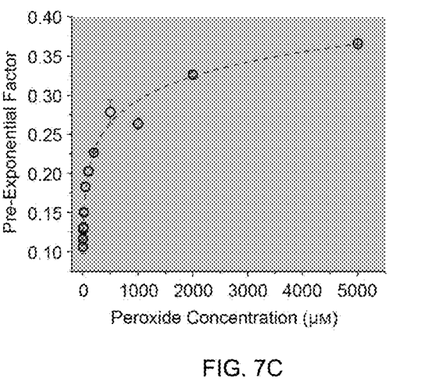
Figure 7D:
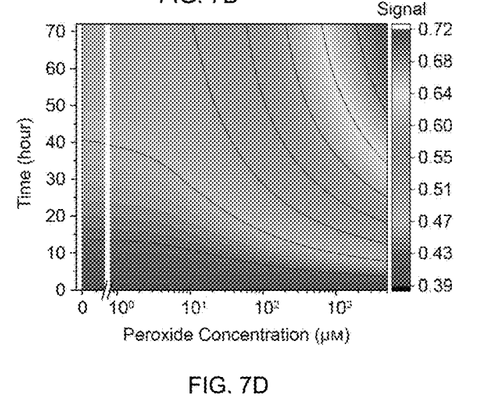

A wearable fibrous device for continuous peroxide monitoring utilizes a two-dimensional calibration curve where the ratiometric signal is a function of both analyte concentration and time. The heatmap in FIG. 7 demonstrates the ratiometric signal as a function of the tested concentrations of peroxide and time points. We plotted the ratiometric signal as a function of time for all concentrations (FIG. 7a). Interestingly, the data for all examined peroxide concentrations could be fit to single exponential association where the offset ($R_0$) and time constant ($\tau$) of the single exponential showed a narrow distribution with small standard errors of the means. The lack of dependence on peroxide concentration found within the fitted time constants, including the dataset of zero added peroxide, suggests the dominant physical process being modeled is that of the DNA rearrangement on the SWCNT surface. In contrast, the pre-exponential factors (A) displayed a concentration-dependent trend which could be fit to a power function. A two-input calibration function provides a ratiometric signal expressed as a function of both peroxide concentration and time. To further examine the real-time response of the textiles to peroxide upon concentration fluctuations, we exposed the samples to two different concentrations of peroxide (500 μM and 5 mM), and acquired the fluorescence spectra every 1 minute. There was an abrupt concentration-dependent decrease in the fluorescence intensity immediately following the addition of peroxide at 5 minutes. Moreover, the ratiometric signal deviated from the control in a concentration-dependent manner, confirming the fast response time of the textiles to varying peroxide concentrations. Finally, to examine the reversibility of the platform, we exposed a sample to peroxide (200 μM) and then washed it with PBS. We observed that the ratiometric signal increased 10 minutes after exposure to the peroxide and then completely reverts back to the original signal 50 minutes after removing it.

$$R=R_0+A(1-e^{-t/\tau}); R_0=0.333\pm9.28E-4,$$
$$\tau=(29.305\pm0.615) \text{ hour} \qquad \text{Equation 1:}$$

$$A=(C+C_0)^p-A_0 \; C_0=(10.796\pm0.596) \text{ μM},$$
$$p=0.035\pm2.52E-4, A_0=0.972\pm3.34E-3 \qquad \text{Equation 2:}$$

$$R=R_0[(C+C_0)^p-A_0](1-e^{-t/\tau}) \qquad \text{Equation 3:}$$

In the presence of biological fluids, it is known that nanoparticles will interact with proteins and other biomolecules to spontaneously and rapidly form a "protein corona" on their surface. This corona can trigger an immune response and result in variations in the intrinsic characteristics of the nanoparticles. In the case of the functionalized SWCNTs, this can alter their fluorescence emission and sensitivity to the chemistry of their local environment. To elucidate the functionality of the optical textiles in a complex biological environment containing proteins, carbohydrates and salts, we seeded RAW 264.7 macrophages on the surface of the textiles for 24 hours and utilized phorbol 12-myristate 13-acetate (PMA) in order to stimulate them to produce and export peroxide to their surrounding media. Macrophages are the immune system's first line of defense, whether as a primary response to a wound or to engulf foreign substances such as nanoparticles that enter the bloodstream. By stimulating the macrophages to produce approximately 1000 μM of peroxide, an abrupt reduction in the fluorescence intensity and increase in the ratiometric signal was observed in less than 30 minutes, confirming our results from the solutions of peroxide.

Figure 8:
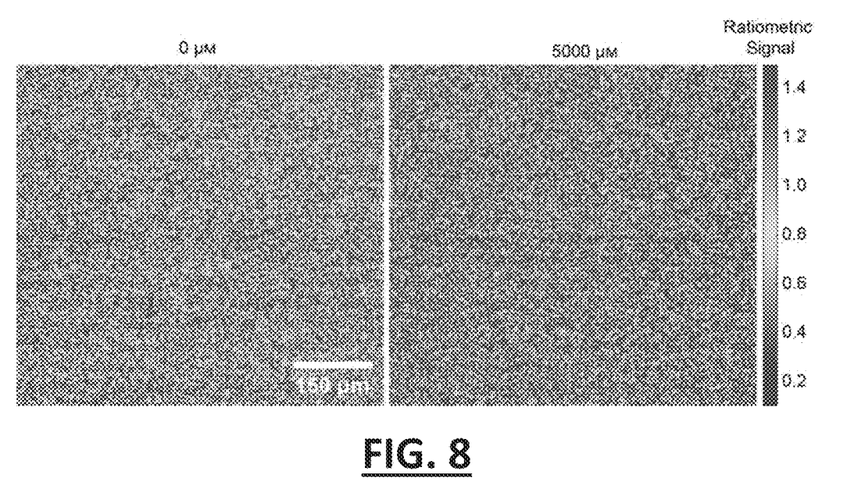
FIG. 8 illustrate spatially detection of peroxide. The maps were created by acquiring NIR fluorescence hyperspectral images and dividing the max intensity image of the (8,7)-SWCNT by the max intensity image of the (9,4) chirality SWCNT. Since the data were acquired using a 5× objective, the individual fibers cannot be observed.

In contrast to an average concentration reported by a single readout, the ability to spatially resolve peroxide concentrations will enable an end-user the ability to map peroxide on the surface of a wound. We exposed the microfibrous samples to different concentrations of peroxide and acquired hyperspectral fluorescence images from the surface of the samples under 5× magnification using the setup shown in FIG. 5a. By dividing the maximum intensity images of the (8,7)-SWCNT by the (9,4)-SWCNT, at FIG. 8 we created maps where each pixel represented a ratiometric signal. At time zero, the maps for all concentrations of peroxide were dominated by blue pixels (low ratiometric signal). After 24-hour exposure to peroxide, the pixel colors among the maps diverge and are dominated by yellow color at low concentrations and red color at high concentrations. This demonstrates the potential of employing our optical fibrous platform to quantitatively image the surface of a wound in a label-free manner utilizing a NIR camera along with the appropriate bandpass filters. This can be performed either after a bandage has been removed from the wound by correlating to spatial position from the wound if the bandage is carefully removed and its location documented or while the bandage is in place on the wound.

Figure 9:
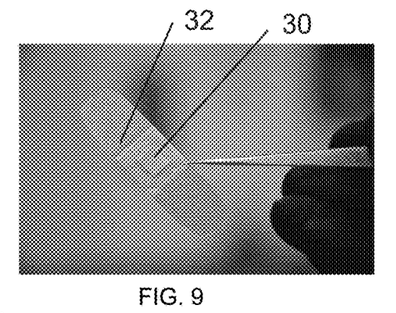
FIGS. 9 and 9a (a) show integrating the optical fibrous samples into a commercial wound bandage.
Figure 9A:
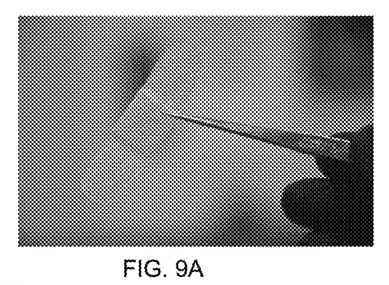
Figure 9B:
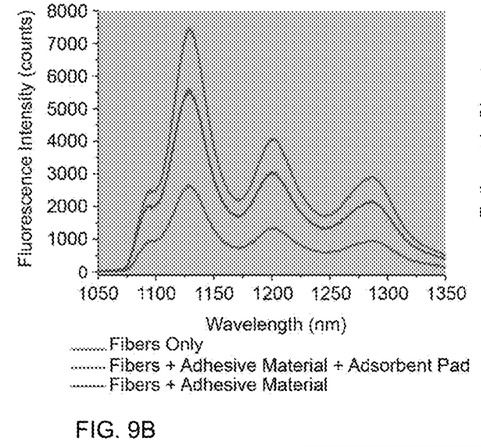
Figure 9C:
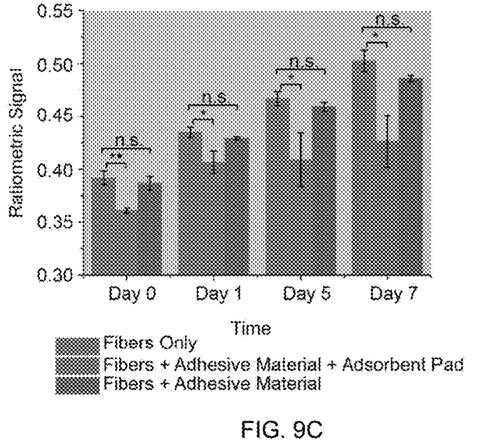

To illustrate the potential of our optical fibrous platform as a smart wound dressing for in situ monitoring of peroxide, FIG. 9a and a1 show a fibrous textile sample 30 attached onto a commercial wound bandage 32 to create an optically active wearable bandage. By attaching the samples to the complete bandage (adhesive material+adsorbent pad) or only to the adhesive material of the bandage, the fluorescence of SWCNTs was still detectable by our probe spectrometer through the bandage and with a high signal to noise ratio for each peak (FIG. 9b). The drop in the signal compared to the control is presumably due to the polymers in the bandage that absorb a portion of the excitation light and/or emitted fluorescence from the SWCNTs. Additionally, the combination of sample plus the adhesive material did not significantly alter the ratiometric signal even after 7 days of soaking in PBS whereas the optical attenuation in presence of the complete bandage appears to have a dependence on wavelength, and thus it alters the ratiometric signal and increases the heterogeneity from the readout as indicated from the larger error bars (FIG. 9c).

Figure 9D:
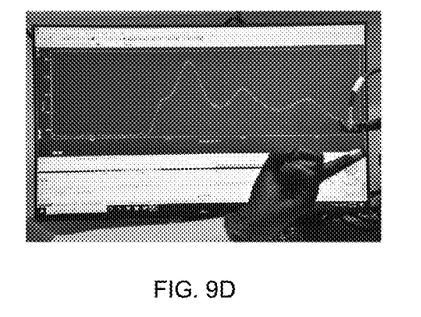

Finally, FIG. 9d demonstrates the feasibility of a real-time wireless wound screening utilizing our flexible optical fibrous platform attached onto the commercial bandage. Transferring this technology from the bench to the bedside is undoubtedly contingent upon designing portable and wearable NIR fluorescence spectrometers. The recent advances in optoelectronics has enabled fabrication of miniaturized thermoelectrically cooled (TEC) InGaAs photodiodes. As a future direction for this work, we aim to construct portable and wearable NIR fluorescence detectors, capable of transducing the data to a smart phone, by assembling a TEC InGaAs photodiode, an LED light source and bandpass filters into portable and wearable platforms to enable point-of-care wound diagnostics. Furthermore, it is worth mentioning that hydrogen peroxide has been traditionally utilized for wound cleaning.

Multi-compartment smart wound dressings have attracted a substantial interest in the past few years due to their potential for enabling simultaneous wound monitoring and healing. A smart wound dressing usually integrates multiple layers into a single flexible biomaterial platform. A therapeutic layer can be designed to enable wound healing by incorporating antibiotics, growth factors, etc., into a 3D biocompatible scaffold such as hydrogels and microfibers. Moreover, a sensing layer would enable continuous monitoring of multiple biomarkers in the wound environment. In this work, we employed a one-step coaxial electrospinning process to encapsulate ssDNA-SWCNT nanosensors into individual microfibers to fabricate wearable optical microfibrous textiles, as a sensing layer, for monitoring oxidative stress in wounds. Utilizing confocal Raman microscopy of individual fibers over time, we uncovered that the SWCNT nanosensors are preserved inside of the fibers over time and that a negligible quantity of the nanosensors are released from a 3D fibrous matrix after 21 days. As multiple nanotube chiralities in the HiPco sample respond differentially to peroxide molecules, we designed an optical wearable platform to ratiometrically detect peroxide at physiologically relevant concentrations. Utilizing this flexible optical microfibrous material, the wireless detection of peroxide was demonstrated in cellular environment. In addition to a single real-time readout, we demonstrated the potential of our platform for spatially resolving the peroxide concentrations on a wound surface using an InGaAs camera, without the need to use any additional marker. We finally integrated our microfibrous textiles onto a commercial wound bandage and indicated the compatibility of this platform with existing wound dressings. In its current form, we have utilized a benchtop NIR probe spectrometer for signal acquisition from the samples, however, in our future work we aim to miniaturize the external unit to create portable and wearable versions of the detection platform. Furthermore, we see potential for developing wearable technologies capable of detecting a wide range of other biomolecules including proteins, hormones and carbohydrates, based on our wearable platform, in wounds and other biological fluids such as sweat.

Figure 10:
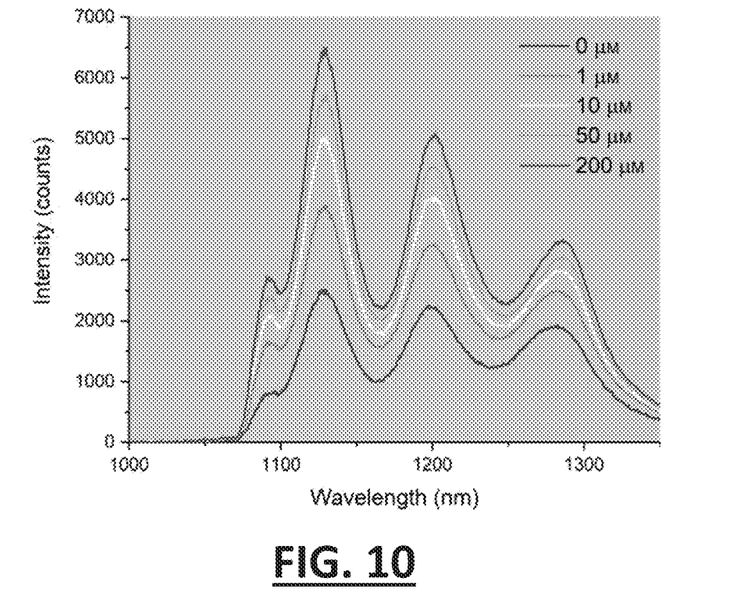
FIG. 10 depicts the response of a microfiber sample constructed with (GT)6-SWCNTs in response to varying concentrations of dopamine. 30 minutes after addition.
Figure 11:
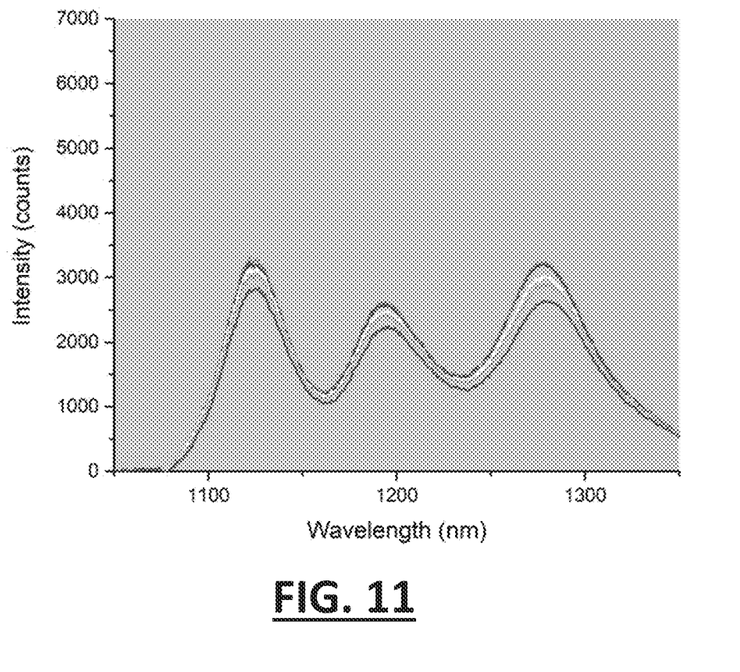
FIG. 11 depicts a microfiber sample constructed with PEG-SWCNTs in response to varying concentrations of dopamine 30 minutes after addition.
Figure 12:
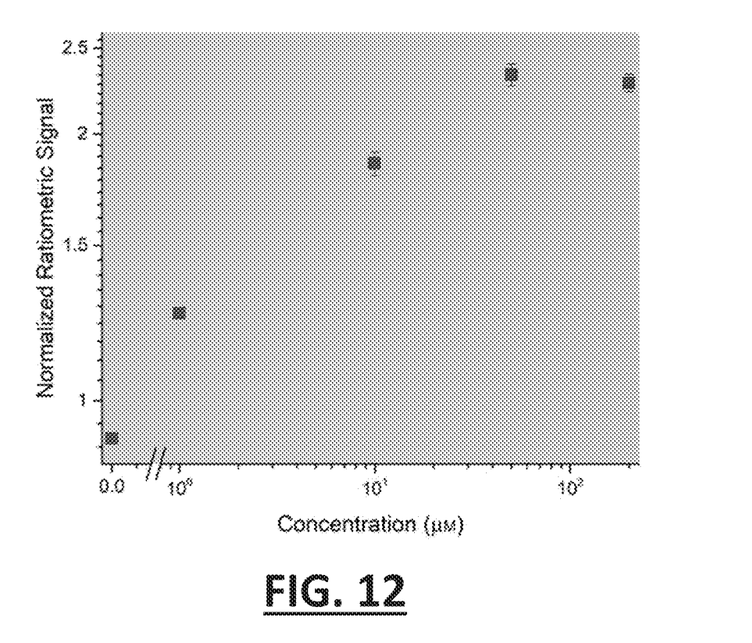
FIG. 12 provides normalized fluorescence intensity as a function of dopamine concentration.

In an alternate embodiment SWCNT nanosensors are employed to detect dopamine. Electrospun microfibers were synthesized containing single-walled carbon nanotubes (SWCNTs) with either a $(GT)_6$ single-stranded oligonucleotide functionalization or a polystyrene sulfonate (PSS) functionalization. The $(GT)_6$ functionalization is known to selectively respond to dopamine via enhancements in overall fluorescence intensity. The PEG is known as one of the best functionalizations to resist changes in fluorescence intensity upon addition of analytes. Here, a ratiometric signal is explored by using $(GT)_6$-SWCNTs in electrospun microfibers that respond to dopamine adjacent to PEG-SWCNTs that do not significantly respond to dopamine. The resultant normalized signal can be acquired as (change in $(GT)_6$-SWCNT sample) divided by (change in PEG-SWCNT sample). FIG. 10 depicts the response of a microfiber sample constructed with (GT)6-SWCNTs in response to varying concentrations of dopamine. 30 minutes after addition. While FIG. 11 depicts a microfiber sample constructed with PEG-SWCNTs in response to varying concentrations of dopamine 30 minutes after addition. FIG. 12 provides normalized fluorescence intensity as a function of dopamine concentration.

The normalized ratiometric fluorescence intensity signal as a function of dopamine:

$$\text{Normalized Ratiometric Signal} = \frac{\frac{I_{GT6-(9,4),0.5hr}}{I_{GT6-(9,4),0hr}}}{\frac{I_{PEG-(8,7),0.5hr}}{I_{PEG-(8,7),0.5hr}}}$$

Figure 13:
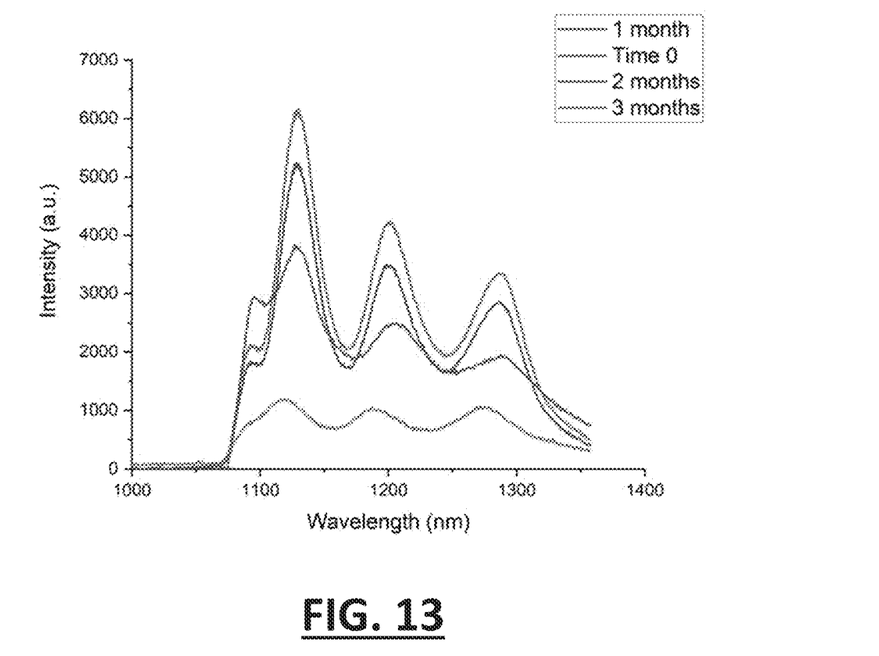
FIG. 13 shows fluorescence intensity from (GT)15-SWCNT microfibers exposed to ambient conditions as a function of time after creation.
Figure 14:
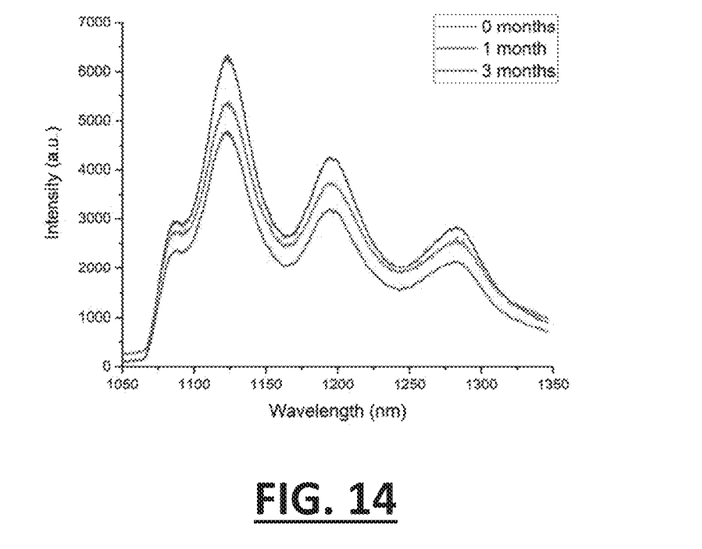
FIG. 14 depicts fluorescence intensity from (GT)15-SWCNT microfibers in a vacuum sealed pouch as a function of time after creation.

Long Term Stability Assays:

Quenching behavior was observed in electrospun microfibers comprising hydrogen peroxide sensing $(GT)_{15}$-SWCNT samples that sat in ambient conditions exposed to the atmosphere. It was found that immediately vacuum-sealing the microfiber samples after electrospinning preserved the fluorescence and resultant sensitivity for many months. FIG. 13 shows fluorescence intensity from $(GT)_{15}$-SWCNT microfibers exposed to ambient conditions as a function of time after creation. While sealing the microfibers in a vacuum after creation will preserve the functionality. FIG. 14 depicts fluorescence intensity from $(GT)_{15}$-SWCNT microfibers in a vacuum sealed pouch as a function of time after creation.

The present disclosure may provide ions for analytes for detection including, but not limited to: Calcium, Nitrate, Phosphate, Cadmium, Mercury, Arsenic and combinations thereof. Further, the present disclosure provides small molecules for analytes for detection including: Hydrogen peroxide, Nitric Oxide (NO), Dopamine, Glucose, Cortisol and combinations thereof.

Oligonucleotides for analytes for detection may include: miRNA, mRNA, Viral RNA, DNA and combinations thereof. Peptides/Proteins suitable as analytes for detection include protein fragments and full proteins.

Other analytes for detection may include Carbohydrates such as Lipopolysaccharide (LPS) bacteria, Lipids including LDL/HDL/Cholesterol, Ceramides and Sphingomyelin.

While the disclosure provides a primary detection mode, alternative modes of detection include Near-infrared fluorescence broadband intensity, Near-infrared fluorescence chirality-resolved intensity, Near-infrared fluorescence chirality-resolved wavelength and Near-infrared fluorescence chirality-resolved full-width at half-maximum.

It can therefore be seen that the present disclosure provides a wearable optical platform is able to wirelessly and reversibly detect peroxide in a physiologically relevant range for wounds (1-250 µM), without the requirement to embed any electronics or power sources within the textile itself. The ratiometric characteristic of the NIR fluorescence sensor facilitates in vivo and clinical applications as it transduces an absolute signal that is not dependent on excitation source distance nor exposure time. Moreover, the optical textiles are able to detect peroxide in real-time in the presence of peroxide-producing macrophages, demonstrating the capability of the platform for ROS monitoring in complex biological environments. Also indicated is potential of the optical textiles for spatially resolving the chemical indicators such as peroxide and dopamine concentrations using hyperspectral fluorescence microscopy. Finally, the microfibrous platform is attached to a conventional wound bandage demonstrating the feasibility of in situ measurements of chemical indicators such as peroxide and dopamine in wounds. As such the disclosure provides on-skin biomarkers for wounds and sweat, sub-cutaneous biomarkers for use in the bloodstream, intra-peritoneal biomarkers for implantation near prostate, ovaries, etc. and non-biological for use in detecting seawater contaminants, pharmaceutical contaminants, strain/stress sensing.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. An optically reactive core-shell microfiber comprising:
    a core comprising:
        a first polymer; and
        a plurality of optically reactive, functionalized single walled carbon nano tubes (SWCNTs) dispersed within the polymer; and
    a shell comprising:
        a second polymer disposed coaxially about the core, said second polymer comprising a biocompatible, biodegradable, bioresorbable polymer,
    said microfiber having a diameter (Df) in the range of 0.5 µm to 30 µm, a core diameter size (Dc) in the range of 0.25 µm to 20 µm, and a shell thickness (Ts) range of 0.25 µm to 10 µm.

2. The optically reactive core-shell microfiber of claim 1 wherein said microfiber has a diameter (Df) in the range of 5 µm to 10 µm, a core diameter size (Dc) in the range of 1 µm to 3 µm, and a shell thickness (Ts) range of 4 µm to 7 µm.

3. The optically reactive core-shell microfiber of claim 2 wherein said first polymer is selected from the group consisting of: Polyethylene oxide, Polyvinyl alcohol (PVA), Polyvinylpyrrolidone (PVP), Collagen, Gelatin, Chitosan, Alginate, Polyacrylic acid (PAA), Polyacrylamides, Dextran, Cellulose, Hyaluronic acid (HA), Starch, Glycerol and combinations thereof.

4. The optically reactive core-shell microfiber of claim 2 wherein said second polymer is selected from the group consisting of: Polycaprolactone, Polyurethane (PU), Polycarbonate (PC), Nylon, Polystyrene, Polytetrafluoroethylene (PTFE), Polylactic acid (PLA), Polymethyl methacrylate (PMMA), Polyaniline (PANI), Polyacrylonitrile (PAN), Polylactic-co-glycolic acid (PLGA), Polydimethylsiloxane (PDMS) and combinations thereof.

5. The optically reactive core-shell microfiber of claim 2 wherein said second polymer comprises polycaprolactone.

6. The optically reactive core-shell microfiber of claim 1, wherein said optically reactive, functionalized SWCNT is optically reactive to changes in levels of an oxidation-reduction (REDOX) analyte.

7. The optically reactive core-shell microfiber of claim 6, wherein said optically reactive, functionalized SWCNT is optically reactive to changes in levels of hydrogen peroxide.

8. The optically reactive core-shell microfiber of claim 6, wherein said optically reactive, functionalized SWCNT is optically reactive to changes in levels of dopamine.

9. The optically reactive core-shell microfiber of claim 1 wherein a density of said functionalized SWCNTs within said fiber is in the range of 0.001 wt/wt % to 0.0005 wt/wt % (weight of SWCNT/(weight of SWCNT+total weight of core and shell polymers)).

10. The optically reactive core-shell microfiber of claim 9 wherein said first polymer is selected from the group consisting of: Polyethylene oxide, Polyvinyl alcohol (PVA), Polyvinylpyrrolidone (PVP), Collagen, Gelatin, Chitosan, Alginate, Polyacrylic acid (PAA), Polyacrylamides, Dextran, Cellulose, Hyaluronic acid (HA), Starch, Glycerol and combinations thereof.

11. The optically reactive core-shell microfiber of claim 9 wherein said first polymer comprises Polyethylene oxide.

12. The optically reactive core-shell microfiber of claim 9 wherein said second polymer is selected from the group consisting of: Polycaprolactone, Polyurethane (PU), Polycarbonate (PC), Nylon, Polystyrene, Polytetrafluoroethylene (PTFE), Polylactic acid (PLA), Polymethyl methacrylate (PMMA), Polyaniline (PANI), Polyacrylonitrile (PAN), Polylactic-co-glycolic acid (PLGA), Polydimethylsiloxane (PDMS) and combinations thereof.

13. The optically reactive core-shell microfiber of claim 9 wherein said second polymer comprises polycaprolactone.

14. The optically reactive core-shell microfiber of claim 1 wherein said first polymer is selected from the group consisting of: Polyethylene oxide, Polyvinyl alcohol (PVA), Polyvinylpyrrolidone (PVP), Collagen, Gelatin, Chitosan, Alginate, Polyacrylic acid (PAA), Polyacrylamides, Dextran, Cellulose, Hyaluronic acid (HA), Starch, Glycerol and combinations thereof.

15. The optically reactive core-shell microfiber of claim 1 wherein said first polymer comprises Polyethylene oxide.

16. The optically reactive core-shell microfiber of claim 1 wherein said second polymer is selected from the group consisting of: Polycaprolactone, Polyurethane (PU), Polycarbonate (PC), Nylon, Polystyrene, Polytetrafluoroethylene (PTFE), Polylactic acid (PLA), Polymethyl methacrylate (PMMA), Polyaniline (PANI), Polyacrylonitrile (PAN), Polylactic-co-glycolic acid (PLGA), Polydimethylsiloxane (PDMS) and combinations thereof.

17. The optically reactive core-shell microfiber of claim 1 wherein said second polymer comprises polycaprolactone.

18. A core-shell microfiber comprising:
a core comprising:
a first polymer; and
a plurality of functionalized single walled carbon nano tubes (SWCNTs) dispersed within the polymer; and
a shell comprising:
a second polymer disposed coaxially about the core,
said second polymer comprising a biocompatible, biodegradable, bioresorbable polymer,
said microfiber having a diameter (Df) in the range of 0.2 µm to 30 µm, a core diameter size (Dc) in the range of 0.1 µm to 20 µm, and a shell thickness (Ts) range of 0.1 µm to 10 µm,
wherein said functionalized SWCNT is functionalized to detect hydrogen peroxide.

19. A core-shell microfiber comprising:
a core comprising:
a first polymer; and
a plurality of functionalized single walled carbon nano tubes (SWCNTs) dispersed within the polymer; and
a shell comprising:
a second polymer disposed coaxially about the core,
said second polymer comprising a biocompatible, biodegradable, bioresorbable polymer,
said microfiber having a diameter (Df) in the range of 0.2 µm to 30 µm, a core diameter size (Dc) in the range of 0.1 µm to 20 µm, and a shell thickness (Ts) range of 0.1 µm to 10 µm,
wherein said functionalized SWCNT is functionalized to detect dopamine.

* * * * *